US012593742B2

(12) United States Patent
Romsaas et al.

(10) Patent No.: US 12,593,742 B2
(45) Date of Patent: Apr. 7, 2026

(54) SEED COULTER FOR DIRECT SEED DRILL, SEEDING UNIT COMPRISING SAID SEED COULTER AND SOWING MACHINE COMPRISING SEVERAL SEEDING UNITS

(71) Applicant: Sulerud AS, Sørum (NO)

(72) Inventors: Gulbrand Romsaas, Sørum (NO);
Terje Gulbrand Romsaas, Sørum (NO)

(73) Assignee: Sulerud AS, Sørum (NO)

( * ) Notice: Subject to any disclaimer, the term of this patent is extended or adjusted under 35 U.S.C. 154(b) by 704 days.

(21) Appl. No.: 17/912,756

(22) PCT Filed: Mar. 22, 2021

(86) PCT No.: PCT/NO2021/050072
§ 371 (c)(1),
(2) Date: Sep. 19, 2022

(87) PCT Pub. No.: WO2021/194346
PCT Pub. Date: Sep. 30, 2021

(65) Prior Publication Data
US 2023/0146967 A1     May 11, 2023

(30) Foreign Application Priority Data

Mar. 23, 2020     (NO) .................................... 20200338

(51) Int. Cl.
| *A01C 7/06* | (2006.01) |
| *A01C 5/06* | (2006.01) |
| *A01C 7/20* | (2006.01) |
| *A01C 7/00* | (2006.01) |

(52) U.S. Cl.
CPC ................ *A01C 5/062* (2013.01); *A01C 7/06* (2013.01); *A01C 7/203* (2013.01); *A01C 7/006* (2013.01)

(58) Field of Classification Search
CPC ........... A01C 5/062; A01C 7/06; A01C 7/203; A01C 7/006; A01C 7/201; A01C 7/206
See application file for complete search history.

(56) References Cited

U.S. PATENT DOCUMENTS

| 5,161,472 A | 11/1992 | Handy |
| 5,562,054 A | 10/1996 | Ryan |
(Continued)

FOREIGN PATENT DOCUMENTS

| CA | 2861705 A1 | * | 3/2015 | |
| CN | 108432411 A | * | 8/2018 | ............. A01G 13/37 |
(Continued)

OTHER PUBLICATIONS

Norwegian Search Report for NO 20200338, dated Oct. 12, 2020.
International Search Report and the Written Opinion for PCT/NO2021/050072, dated Jun. 2, 2021.

*Primary Examiner* — Alicia Torres
(74) *Attorney, Agent, or Firm* — Andrus Intellectual Property Law, LLP

(57) ABSTRACT

A seed coulter arranged to place one or more inputs in a groove behind a tine of a direct seed drill for field crops. The seed coulter is arranged for displaceable connection to the tine and is freely displaceable in the longitudinal direction of the tine between a lower position and an upper position. A seeding unit comprising the seed coulter. A direct seed drill comprising a plurality of the seeding units.

15 Claims, 10 Drawing Sheets

(56) References Cited

U.S. PATENT DOCUMENTS

| | | | | |
|---|---|---|---|---|
| 8,220,559 B2 * | 7/2012 | Ryan | ...................... | A01C 5/062 111/120 |
| 2017/0257999 A1 | 9/2017 | Ryan | | |
| 2018/0332762 A1 | 11/2018 | Melanson et al. | | |

FOREIGN PATENT DOCUMENTS

| | | | | | |
|---|---|---|---|---|---|
| CN | 110121996 | | 8/2019 | | |
| CN | 112056052 A | * | 12/2020 | .............. | A01C 7/06 |
| DE | 3332964 C1 | | 1/1985 | | |
| DE | 102018004261 A1 | | 11/2019 | | |
| FR | 2165919 | | 8/1973 | | |
| NO | 146655 | | 8/1982 | | |
| RU | 184917 U1 | * | 11/2018 | .............. | A01C 7/00 |
| RU | 186298 U1 | * | 1/2019 | .............. | A01C 7/06 |
| WO | WO-2010091469 A2 | * | 8/2010 | ............ | A01C 5/062 |
| WO | 2013/066250 | | 5/2013 | | |
| WO | WO-2017124143 A1 | * | 7/2017 | .............. | A01C 7/06 |

* cited by examiner

SEED COULTER FOR DIRECT SEED DRILL, SEEDING UNIT COMPRISING SAID SEED COULTER AND SOWING MACHINE COMPRISING SEVERAL SEEDING UNITS

CROSS-REFERENCE TO RELATED APPLICATIONS

This application is the U.S. national stage application of International Application PCT/NO2021/050072, filed Mar. 22, 2021, which international application was published on Sep. 30, 2021, as International Publication WO 2021/194346 in the English language. The International Application claims priority of Norwegian Patent Application No. 20200338, filed Mar. 23, 2020. The international application and Norwegian application are both incorporated herein by reference, in entirety.

FIELD

The invention relates to a seed coulter for a direct seed drill. The invention also describes a seeding unit comprising the seed coulter and a direct seed drill comprising the seed coulter.

BACKGROUND

For establishing a stand of field crops, there are three dominant methods: conventional tillage with subsequent seeding, reduced tillage with subsequent seeding, and direct seeding.

Conventional tillage involves ploughing the soil so that straw, plant residues and weeds are covered with soil and are converted into humus. The ploughed soil is tilled with a leveller and/or a harrow to establish a seedbed. Then a seed drill is used to place seeds and possible fertilizer in the soil. Conventional tillage has the drawback of the soil being exposed and thereby being subjected to erosion and drying in some areas and periods. Besides, conventional tillage is resource-intensive as the method usually requires 3-4 separate operations and passes over the field.

In reduced tillage, a top layer of the soil is tilled with, for example, a cultivator or a disc harrow so that soil and plant residues are mixed. Then the soil is seeded and possibly fertilized with a seed drill. The plant residues in the top layer help to bind the soil so that the risk of erosion and overland flow is smaller than in conventional tillage. But, because the whole area has been tilled, reduced tillage involves a certain risk of erosion and overland flow, especially in undulated terrain. Reduced tillage is less resource-intensive than conventional tillage.

In direct seeding, a seed drill that can be run directly on the stubble without any preceding tilling of the soil is used. A direct seed drill may be provided with a tine harrow or a disc harrow in front of the seed coulters, which tills and mixes the soil and plant residues in the same way as in reduced tillage. The risk of erosion and overland flow is at the level of that of reduced tillage. The seed coulters of a conventional seed drill and a direct seed drill normally have an inter-centre distance of between 10 and 15 cm. Direct seeding is an energy-efficient method as several operations can be done simultaneously. The Väderstad Rapid is an example of a conventional direct seed drill.

To reduce the drawbacks of direct seeding, a strip-till seed drill can be used. While a direct seed drill tills 100 percent of the area, a strip-till seed drill tills only 5-20 percent of the area. A plurality of tines, known as loosening tines, form vertical stripes in the soil. The tines may stand side by side in one or more rows. The tines normally have an inter-centre distance of about 30 cm, and the area between the tines is not tilled. Each tine typically has a working width of between 2 and 5 cm. The working depth of the tine may be between 10 and 40 cm, depending on the soil conditions. The normal working depth is 20-25 cm. The tine loosens the soil and lets in air to give good growing conditions for the seeds. In front of each tine, a cutting blade or a disc coulter may be mounted, which cuts straw residues, and which makes a cut into the soil so that the tine can be moved more easily through the soil. Fertilizer, if any, can be distributed into the soil via fertilizer spouts right behind the tine. The fertilizer spouts may be formed in such a way that the fertilizer is laid at the working depth of the tine, possibly between the working depth of the tine and the soil surface. The fertilizer spouts may be fixed to the tine. The fertilizer is normally positioned deeper than seeds so that a growing plant may absorb nutrition via its roots when the roots are growing downwards in the soil. Behind the tines, there is normally a row of supporting wheels. Behind the supporting wheels and in line with each tine, there are corresponding seed coulters, one seed coulter for each tine. A portion of the seed coulter is positioned down in the groove formed by the corresponding loosening tine. The seed coulter may be straight, so that the seeds are sown in a width that is equal to or narrower than the seed coulter. The seed coulter may comprise wings that provide a horizontally extended groove into which the seeds are spread. The width of the groove may be 10-15 cm, so that the seeding distance will be the same as that of an ordinary seed drill. The seeding depth is typically 5 cm but may be smaller or larger. The seed coulter is normally placed 2-3 metres behind the corresponding tine. The Mzuri Pto-Til and the Horsch Focus TD are examples of a strip-till seed drill as described above.

The great advantage of a strip-till seed drill is that the greater part of plants and plant residues on the field that is being tilled remains untouched, thereby giving good protection against evaporation, erosion and overland flow. Strip tillage and strip-till seed drills are originally designed for large flat areas with little precipitation, small crops and amounts of straw, like in North America and Australia.

A problem with prior-art strip-till seed drills is inaccurate placing of the seed in fields with a lot of plant residues and/or when sowing in curves and/or on a sideways slope. Plant residues may give an uneven soil surface so that the seed coulter gets an uneven working depth or is lifted out of the groove. In a curve, the seed coulters will rotate around the supporting wheels. If the seed coulters are mounted on directionally rigid arms, the seed coulters may therefore be pushed up and out of the groove in curves. On a sideways slope, gravity will pull the strip-till seed drill downwards so that it will have a slanted position relative to the direction of travel. In that way, the seed coulters will be pushed out and up from the groove. The problems of sowing in a curve and on a sideways slope increase proportionally to the distance between the tines and the seed coulters. The positioning of the seed coulters at the very rear of the seed drill also makes them prone to damage during transport and when the seed drill is being reversed into position, for example in a corner of a field.

Strip tillage has both agronomical and environmental benefits. In Norway, most of the field areas are undulated, and the drawbacks that are described above therefore limit the spread of the method in areas with a topography corresponding to that found in Norway. Solutions that enable the use of strip tillage even in undulated areas are therefore sought.

SUMMARY

The invention has for its object to remedy or reduce at least one of the drawbacks of the prior art or at least provide a useful alternative to the prior art.

The object is achieved through the features that are specified in the description below and in the claims that follow.

The invention is defined by the independent claims. The dependent claims define advantageous embodiments of the invention.

In a first aspect, the invention relates to a seed coulter arranged to place one or more inputs in a groove behind a tine of a direct seed drill for field crops, the direct seed drill comprising one or more tines for tilling, and each tine comprising a front and a back, and the seed coulter comprising at least one delivery channel for carrying said input into the groove behind the tine. The seed coulter is arranged for a displaceable connection to the tine, wherein the seed coulter is freely displaceable in the longitudinal direction of the tine between a lower position and an upper position. The seed coulter is further arranged for connection to a depth-control device for keeping a seeding depth of the seed coulter constant when a working depth of the tine is changed during seeding, by the tine being lowered or raised.

By a direct seed drill may be understood a seed drill arranged for use on untilled soil which is partly or completely covered by plants and/or plant residues, for example straw and grass. The direct seed drill may be used on tilled soil. In an advantageous embodiment, the direct seed drill comprises a plurality of tines. The plurality of tines may be mounted in one or more rows. The direct seed drill may be a strip-till seed drill. By a field crop may be understood a cultivated plant grown on open land, for example cereals, oil plants, maize, beans and grass.

The direct seed drill is arranged to be pulled by a tractor. The direct seed drill may be coupled directly to the tractor or via some other implement, for example a trailer with a container for input. The direct seed drill comprises a frame, to which frame one or more tines are attached. One or more containers for one or more inputs, at least one front implement, at least one after implement and supporting wheels may be mounted on the frame. In an alternative embodiment, the container for the input may mounted on the tractor or a trailer.

By an input may be understood seed and/or fertilizer. The fertilizer may be a mineral fertilizer, referred to as a synthetic fertilizer in technical language. The fertilizer may be granular. The fertilizer may be liquid.

By a seed coulter may be understood a device arranged to transfer one or more inputs like seed and/or fertilizer into the soil. By comparison, a fertilizer coulter is arranged to transfer only fertilizer into the soil.

By freely displaceable may be understood that the seed coulter can be displaced in a stepless manner and independently relative to the tine.

An effect of the seed coulter being arranged for connection to the tine is that the seed coulter can be mounted near the tine for a more accurate placement of the input, especially when sowing in a curve, on a sideways slope and in fields with large amounts of plants. Further, a connection of the seed coulter to the tine as described herein will give reduced material consumption, reduced net weight of the seed drill and reduced material costs because there is no need for a separate suspension of the seed coulters as required by the prior art. A further advantage is that the risk of the seed coulter derailing the groove formed by the tine is eliminated. The seed coulter will also be better protected from damage during transport and when the seed drill is reversed into position, for example towards a stone fence along the edge of a field.

The seed coulter may be arranged for a releasable connection to the tine. Thus, different seed coulters can easily be mounted to the tine, depending on soil conditions and inputs.

An effect of the seed coulter being freely displaceable along the tine is that the seed coulter can provide a seeding depth which is independent of the working depth of the tine. Thus, the working depth of the tine and the seeding depth can be optimized independently of each other, and the seeding depth of the seed coulter can be kept constant while the working depth of the tine is being changed.

In light and loose soil, the working depth of the tine may be 15 cm and the seeding depth 5 cm, for example. In heavy and tight soil, the working depth of the tine may be 35 cm and the seeding depth 5 cm, for example. By the seed coulter being freely displaceable along the tine, the working depth of the tine may be adjusted during driving, while, at the same time, the working depth of the seed coulter may be kept unchanged.

In an alternative embodiment, the seed coulter may be displaced along the tine and locked to the tine, for example with a bolt or a screw connection. In that way, the tine and the seed coulter may be raised and lowered simultaneously, and the difference between the working depth of the tine and the seeding depth is kept constant.

The seed coulter may comprise a prior-art wing share, arranged to provide a groove transversely to the direction of travel for the input. The groove may be horizontal. The groove may be angled relative to a horizontal plane. The effect of the wing is that the input, for example seed, may be placed in two or more stripes or be spread widely. Thus, the inputs may be supplied in a width that is larger than the width of the seed coulter and the groove, and the seeds may be placed in an optimal width, and with the same row spacing as in an ordinary seed drill.

The seed coulter may be connected to a downspout with a clip connection. The clip connection makes it easy to loosen the downspout from the seed coulter by service and maintenance.

The seed coulter may be arranged for connection to a depth-control device.

An effect of connecting the seed coulter to a depth-control device is that the seeding depth can be adjusted. Another effect is that the seeding depth may be kept constant when the working depth of the tine is lowered or raised during seeding, for example as a consequence of changed soil conditions, by the seed coulter being freely displaceable up and down along the tine. The depth adjustment may be stepless. The depth adjustment may be stepped.

The depth-control device may be arranged for sensing the surface of a seedbed.

By sensing the surface of a seedbed is understood, herein, a prior-art wheel, drag shoe, crawler belt or the like, which rolls or is drawn along the surface of the seedbed. In what follows, the term depth wheel is used as a collective term for said depth-control device.

The seed coulter may be coupled to a depth wheel in front of the seed coulter and a depth wheel behind the seed coulter.

The effect of a depth wheel in front of the seed coulter and one depth wheel behind the seed coulter is a more accurate depth control.

The at least one depth wheel may be a single depth wheel. The at least one depth wheel may be two wheels. Said two depth wheels may be positioned coaxially. Said two wheels may be staggered relative to each other in a longitudinal direction of the seed drill. The two juxtaposed wheels may have an axial spacing which is larger than the width of the groove and soil that has been lifted out of the groove, so that the two depth wheels can roll on untilled soil. The two juxtaposed wheels may have a rotatable centre support. The depth wheel may be air-filled. The depth wheel may be compact.

The depth wheel behind the seed coulter may be a prior-art packer wheel.

In an alternative embodiment, the depth-control device may comprise an actuator. The actuator may be connected, at a first end, to the seed coulter and be connected, at a second end, to the tine or frame. The actuator may be a hydraulic cylinder. The actuator may be an electric actuator. The actuator may include means for individual or sectioned height adjustment of a plurality of seed coulters.

An effect of the actuator is that the seeding depth may be adjusted from the driver's seat of the tractor, even during driving. The actuator may be connected to a control system comprising means registering the seeding depth, for example by the means measuring the height between the seed coulter and the ground and/or the seed coulter and the frame. The control system may comprise a control program arranged to control the actuator in such a way that the stroke length of the actuator is reduced when the frame is lowered, and that the stroke length increases when the frame is raised. In that way, a constant seeding depth may be provided without the use of a depth wheel.

The seed coulter may be arranged for linear displacement along the tine.

An effect of this is that the seed coulter can provide a constant angle relative to the tine when the seed coulter is displaced along the tine. Thus, an optimum and identical distribution of the inputs may be provided independently of the seeding depth of the seed coulter. A further effect is that the seed coulter may provide a constant and optimum shear angle in the soil, so that unnecessary wear on the seed coulter may be avoided.

The seed coulter may be arranged to be connected to a pressure-loading device.

The effect of coupling the seed coulter to the pressure-loading device is that the seed coulter may be subjected to a pressure towards the ground so that the seed coulter is not raised uncontrolledly during seeding, for example in consequence of vibrations, uneven soil surface or resistance in the soil.

The pressure-loading device may be taken from a group comprising springs, electric actuators or hydraulic cylinders. The hydraulic cylinder may be connected to an accumulator. The downward force may be adjustable so that the force may be adapted to the conditions. The downward force is typically smaller when sowing in loose soil than when sowing in rigid soil.

The seed coulter may be connected to both a depth wheel and a pressure-loading device. Thus, the seeding depth may be kept constant independently of whether the tine is raised or lowered, and independently of the soil conditions.

It is known that there may be great variations in the soil structure and that this affects how a seed coulter moves in the soil. A straight seed coulter without wings which is connected to the tine as described by the invention will be displaced vertically to a small or no degree because the seed coulter is completely or partially protected by the tine in the direction of travel of the seed drill. In contrast, a seed coulter with wings could easily be forced downwards or upwards in the soil as the wings will, to a certain degree, function as guiding wings. A seed coulter with wings should therefore be provided with both a depth wheel and a pressure-loading device to ensure an even seeding depth in varying soil conditions.

For example, the seed coulter may be set at a working depth of 5 cm. During seeding, the working depth of the tine may be changed and adjusted to the conditions, for example between 15 and 30 cm, while the seeding depth is kept constant at 5 cm.

The seed coulter may include a guiding portion arranged to enclose a portion of the tine.

The guiding portion may be a channel. The guiding portion may be one or more cutouts. A portion of the guiding portion may be arranged to bear against the front of the tine.

The effect of the guiding portion is that the tine pushes the seed coulter forwards in the soil. Thus, the delivery channels in the seed coulter can be positioned close up to the back of the tine for an optimum positioning of the inputs in the soil.

Another advantage is that a lower edge of the seed coulter may be positioned below the tine so that it is only the seed coulter and not the tine that is tilling the soil. This gives increased flexibility with respect to seeding depth and how much the soil should be tilled. This function is particularly relevant when it is desirable to have as little tilling of the soil as possible in seeding, for example in loose soil.

The seed coulter may comprise a front portion with a V-shaped cross section. The front portion may be a wear part. The front portion may protect the tine against wear. Said wear part may be considerably smaller than a tine. It is therefore cheaper and simpler to replace the front portion than a worn tine.

The guiding portion may comprise at least one of a friction-reducing bushing and a guide roller arranged to bear against the front of the tine.

The effect of the friction-reducing bushing and/or guide roller is less friction between the tine and the guiding portion when the seed coulter is being displaced along the tine, and less wear on the tine and the guiding portion. The bushing and the guide roller may be formed from one or more materials. The bushing and the guide roller may comprise metal, wood, plastic and Teflon. The bushing may be a slide bearing. The bushing may be lubricatable. The bushing may be replaceable. The guiding portion may include various bushings. The guiding portion may include various guide rollers. In an advantageous embodiment, the guiding portion also includes a friction-reducing bushing and/or at least two guide rollers arranged to bear against the back of the tine.

On a front, the seed coulter may be provided with one of the dovetail slot or a complementary coupling portion of a dovetail coupling, the dovetail slot or the complementary coupling portion of said dovetail coupling being arranged to engage with the other one of the dovetail slot and a complementary coupling portion of the dovetail coupling arranged on the back of the tine.

In what follows, the term dovetail coupling is used about said dovetail slot and the complementary coupling portion. The dovetail slot may be trapezoidal. The dovetail coupling may have a shape different from the trapezoidal shape, but with the same technical effect as the trapezoidal shape.

The effect of the dovetail coupling is that the seed coulter can be positioned near the back of the tine and that the seed coulter can be coupled to the tine with a strong coupling.

One of the dovetail slot or a portion complementary to the dovetail slot may be an integrated part of the tine. The dovetail slot may be lubricatable to reduce the friction between the two parts belonging to the dovetail slot.

The seed coulter may include a linkage-arm suspension arranged for connection to the tine.

The effect of the linkage-arm suspension is that the seed coulter may be connected in a simple way to a tine with a curved back. By changing the length of one or more linkage arms in the linkage-arm suspension, the motion geometry of the seed coulter can be changed. Linkage arms having the same length will give a parallel movement of the seed coulter, whereas linkage arms of different lengths will give an angular change to the seed coulter when the seed coulter is displaced upwards or downwards.

The seed coulter may include an attachment for connection to a rotary joint on the back of the tine, the rotary joint forming an axis of rotation substantially coinciding with the longitudinal direction of the tine.

Said axis of rotation typically has an angle of between 90 and 60 degrees relative to a horizontal plane.

The effect of the rotary joint is that the seed coulter can be rotated sideways relative to the tine during seeding, and thereby better follow the tine and the groove in a curve. When sowing in a curve, a seed coulter that can move only up and down along the tine, and not sideways, may become pressed against a side edge of the groove and thereby be subjected to lateral forces and increased wear. By the seed coulter being rotatably connected to the tine, said lateral forces and wear on the seed coulter can be partially or completely avoided.

The rotary joint may, for example, comprise a shaft or a downspoute-tube which is attached to the back of the tine, and the seed coulter may comprise two or more corresponding attachments arranged to rotatably engage with the shaft. Thus, the seed coulter may both move vertically and rotate sideways around the centre axis of the rotary joint. The downspoute-tube may be arranged to carry fertilizer into the ground.

In a second aspect, the invention relates to a seeding unit for a direct seed drill, the seeding unit comprising a tine and a seed coulter according to the first aspect of the invention, the seed coulter being connected to the tine.

The effect of the seeding unit is that the connection of the tine and seed coulter may be carried out as preassembly, for the seeding unit subsequently to be distributed and/or mounted on the direct seed drill as a whole.

The seeding unit may be connected to the frame via a rotary joint according to the first aspect of the invention.

The seed coulter may enclose a portion of the tine according to the first aspect of the invention.

The seed coulter may be connected to the tine via a dovetail coupling according to the first aspect of the invention.

The seed coulter may be connected to the tine via a linkage-arm suspension according to the first aspect of the invention.

The seed coulter may be connected to the tine via a rotary joint according to the first aspect of the invention.

The seeding unit may include at least one of a depth-control device, a pressure-loading device, and a coulter according to a first aspect of the invention.

The effect of the seeding unit including one or more of said elements is that the inputs may be placed more precisely in the soil, irrespective of soil conditions.

The coulter may be a disc coulter. The coulter may be a fixed coulter. The effect of the coulter is that soil that is lifted out of the ground and forms a furrow slice to the side of the tine may be moved back into the groove behind the tine and, thus, cover up the groove and the inputs. In an advantageous embodiment, the seeding unit comprises a pair of coulters comprising a right-hand coulter and a left-hand coulter.

The disc coulter may be a combined coulter and depth wheel, referred to as a combined coulter in what follows. On one side, the combined coulter is provided with a protruding portion arranged to form a support surface for the combined coulter against the substrate. The protruding portion may be conical, so that the support surface rests against the substrate when the combined coulter is slanted. The protruding portion may be formed from a plurality of elements, which, on one side, are hinged to the disc coulter. By adjusting the angle of the elements to the disc coulter, the cone angle can be changed. Thus, the angle of the combined coulter can be changed while, at the same time, the contact surface of the bearing face against the supporting surface is kept substantially constant.

A pair of combined coulters may comprise a centre-mounted support so that the coulters may rotate sideways in the direction of travel. When driving along a recess in the field, the pair of combined coulters will rotate sideways around the point of support and thereby give a better depth control than a pair of disc coulters with fixed attachment.

The tine may be arranged for strip tillage.

Strip tillage is known in technical language as strip till. A strip-till tine is characterized by being arranged to provide a narrow groove in the soil, and with as little sideways movement as possible. The working depth is typically 20-30 cm. The working depth may be larger, and the strip-till tine may be arranged to loosen a plough sole. By comparison, a harrow tine and a cultivator tine according to the prior art are arranged for shallow tilling and mixing of soil and plant residues. A harrow tine and a cultivator tine may have a design that gives small or large sideways motion while travelling in order thereby to increase the mixing of soil and plant residues. This is substantially different from a strip-till tine, the purpose of which is to form a straight and narrowest possible groove.

The effect of the strip-till tine is that only parts of the area is tilled. Thus, the greater part of plants and plant residues in the field may remain untouched for a best possible protection against evaporation, erosion and overland flow.

A portion of the tine may have a rectangular cross section. A portion of the tine may have a rounded cross section. The tine may be solid. The tine may be tubular. The tine may comprise a straight-lined working portion. The tine may comprise a curved working portion. By a working portion is meant, herein, a portion which is arranged to be in contact with soil and/or plants when the tine is in use. The working portion may be above the soil surface. The working portion may be below the soil surface. The working portion may extend from a lower end to a point of attachment of the tine to a frame or a tine holder. In an advantageous embodiment, the working portion may be slanted in an upward and rearward direction so that soil and plant residues are lifted up and to the side and are not pressed down.

The tine may comprise a shear bolt, or a prior-art mechanical or hydraulic stone release. A prior-art wear-part point may be connected to the tine in a lower end portion.

In a third aspect, the invention relates to a direct seed drill for field crops, the direct seed drill comprising a plurality of seeding units in accordance with the second aspect of the invention.

The effect of the plurality of seeding units is that the direct seed drill may establish a wide seedbed with minimal tillage of the soil, and that the inputs may be carried into the ground right behind the tines for a positioning as optimal as possible.

The direct seed drill may have a three-point mounting. The direct seed drill may be trailed. The direct seed drill may include one or more containers for an input.

BRIEF DESCRIPTION OF THE DRAWINGS

In what follows, examples of preferred embodiments are described, which are visualized in the accompanying drawings, in which:

FIG. 8 shows, on a smaller scale, a direct seed drill for field crops, the direct seed drill comprising a plurality of seeding units according to FIG. 6a.

DETAILED DESCRIPTION OF THE DRAWINGS

FIGS. 1a, 1b, 1c, 2, 6a, 6b, 7 and 8 show embodiments in which a tine 20 pushes a seed coulter 10. FIGS. 3a, 3b, 3c, 4, 5a and 5b show embodiments in which the tine 20 pulls the seed coulter 10. For the sake of order, "a", "c", "d" and "e" are used to indicate the different embodiments of the tine 20. Correspondingly, "a", "b", "c", "d" and "e" are used to indicate the different embodiments of the seed coulter 10.

Figure 1A:
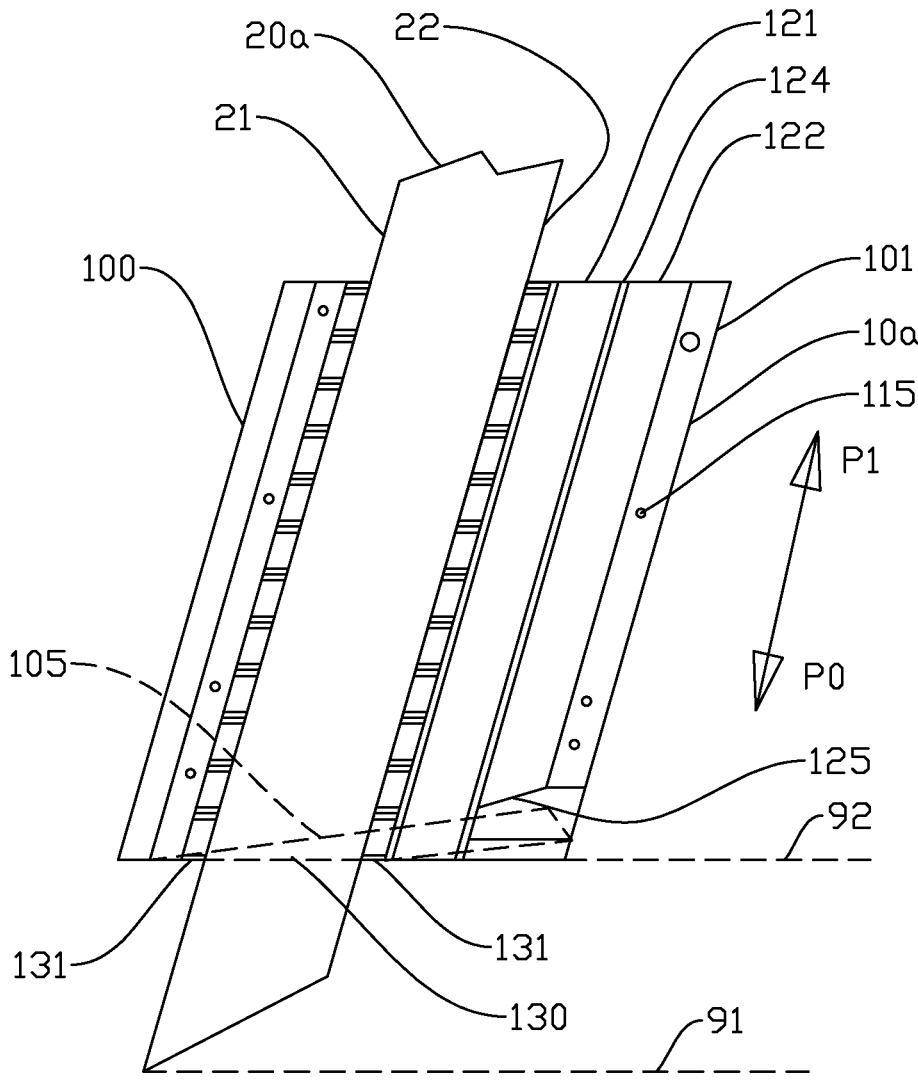
FIG. 1a shows a side view of a first embodiment of a seed coulter connected to a tine, a side cover of the seed coulter having been removed for the sake of exposure.
Figure 1B:
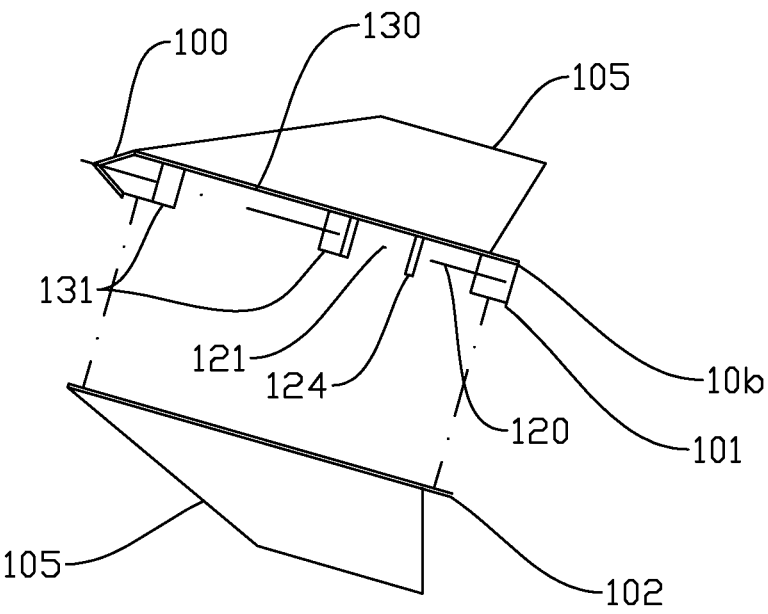
FIG. 1b shows a ground plan of the seed coulter of FIG. 1a in a position in which a side cover has been pulled away from the seed coulter.
Figure 1C:
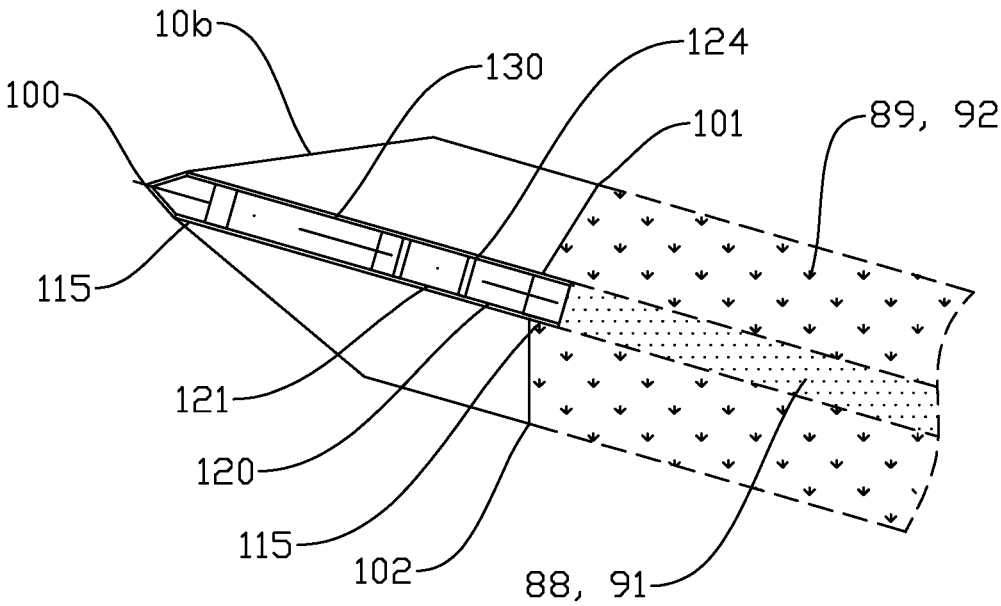
FIG. 1c shows a section of the seed coulter of FIG. 1a put together, the distribution of input being indicated behind the seed coulter.

FIGS. 1a-1c show the seed coulter 10a comprising a main part 101 and a cover 102. FIG. 1a shows the seed coulter 10a connected to a tine 20a, a side cover 102 (see FIGS. 1b and 1c) having been removed for the sake of exposition. FIGS. 1b and 1c show the seed coulter 10a seen from above. In FIG. 1b, the side cover 102 has been separated from the main part 101. In FIG. 1c, the side cover 102 is mounted on the main part 101 via a plurality of screw connections 115.

The seed coulter 10a is displaceable in the longitudinal direction of the tine 20a along the tine 20a between a lower position P0 and an upper position P1. The seed coulter 10a comprises a guiding portion 130 enclosing a portion of the tine 20a. In this embodiment, the guiding portion 130 comprises two bushings 131 resting against a front 21 and a back 22 of the tine 20a. The bushings 131 are arranged to reduce the friction between the guiding portion 130 and the tine 20a when the seed coulter 10a is being displaced upwards and downwards along the tine 20a.

The seed coulter 10a is shown with a first input channel 121 for delivering a first input 88 (see FIG. 1c) and a second input channel 122 for delivering a second input 89 (see FIG. 1c). The two input channels 121, 122 are separated by a channel profile 124. Fertilizer may be carried down in the first input channel 121, and seeds may be carried down in the second input channel 122, or vice versa.

The inputs 88, 89 are carried to the two input channels 121, 122 from containers (not shown) through prior-art supply hoses (not shown).

The first input channel 121 is shown with an open bottom so that the fertilizer 88 may fall onto a bottom layer 91 formed by the tine 20a. The second input channel 122 is shown with a spreading wing 125 arranged to spread the seeds 89 in a horizontal seed layer 92 formed by two wing sections 105 mounted in a lower portion of the seed coulter 10a. Here, the horizontal seed layer 92 is shown positioned above the bottom layer 91.

The seed coulter 10a further comprises a front portion 100 with a V-shaped cross section. A point 103 may be replaceable and attached to the main part 101 via a screw connection (not shown). In an advantageous embodiment, the point 103 may be a wear part.

Figure 2:
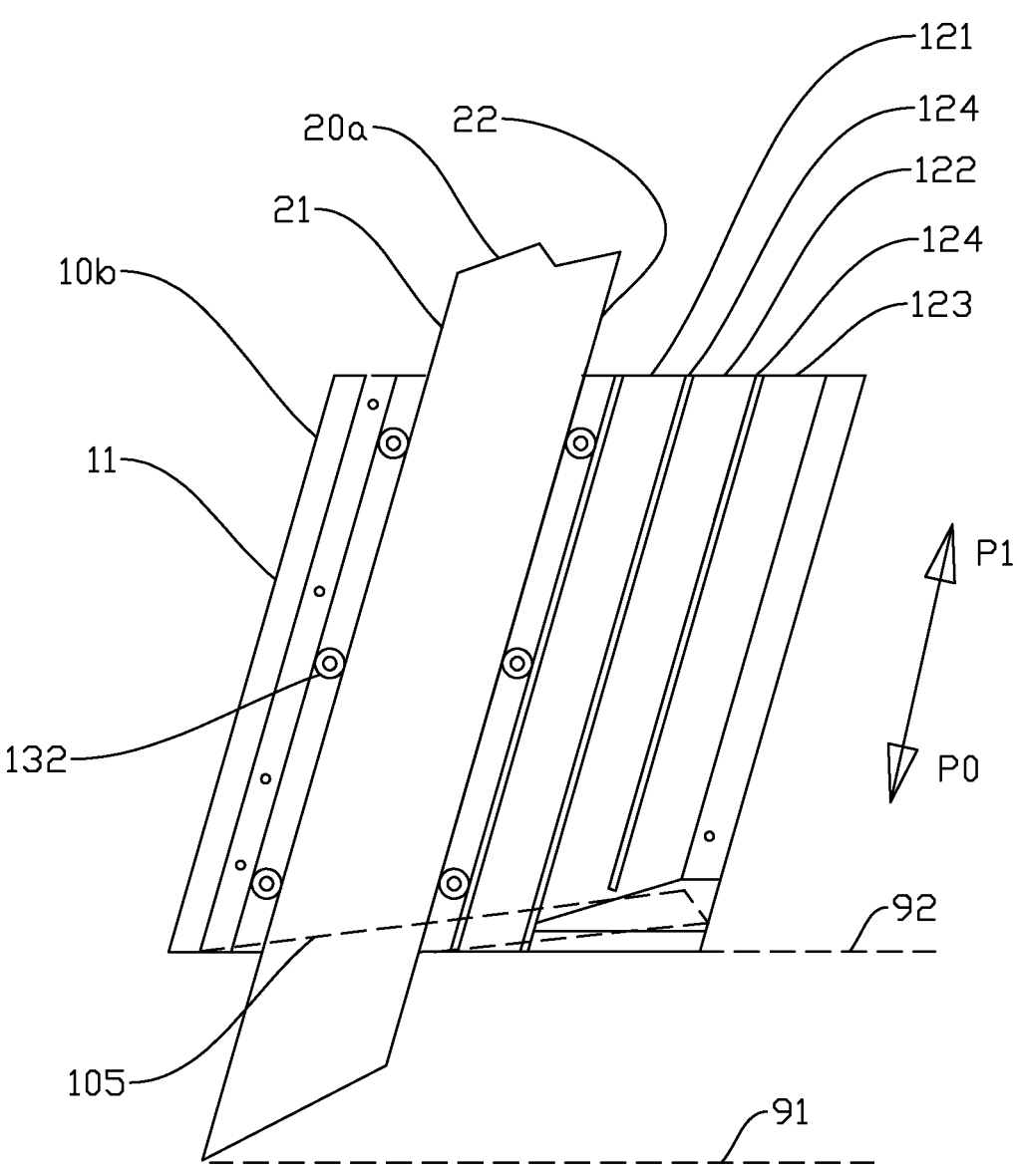
FIG. 2 shows a side view of a second embodiment of the connection of the tine and seed coulter, a side cover of the seed coulter having been removed for the sake of exposition.

FIG. 2 shows a second embodiment of the seed coulter 10b in which the guiding portion 130 is provided with guide rollers 132. The guide rollers 132 bear against and roll along the front 21 and back 22 of the tine 20a.

As is shown in FIG. 2, the seed coulter 10b may comprise a third input channel 123 arranged for delivering a third input, preferably a starter fertilizer for the seeds 89. The second input channel 122 and the third input channel 123 are arranged to lay starter fertilizer and seed, respectively, in the same horizontal seed layer 92 (see FIG. 1c).

Figure 3A:
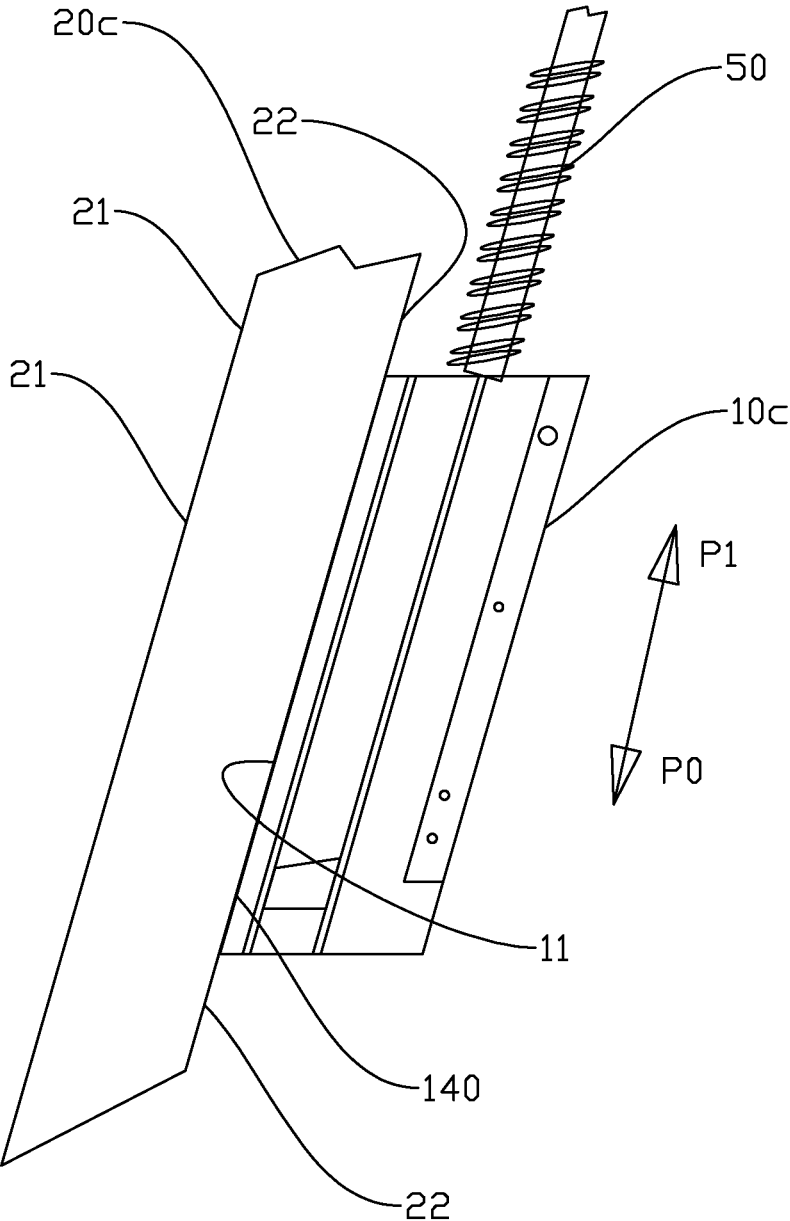
FIG. 3a shows a side view of a third embodiment of the connection of the tine and seed coulter.
Figure 3B:
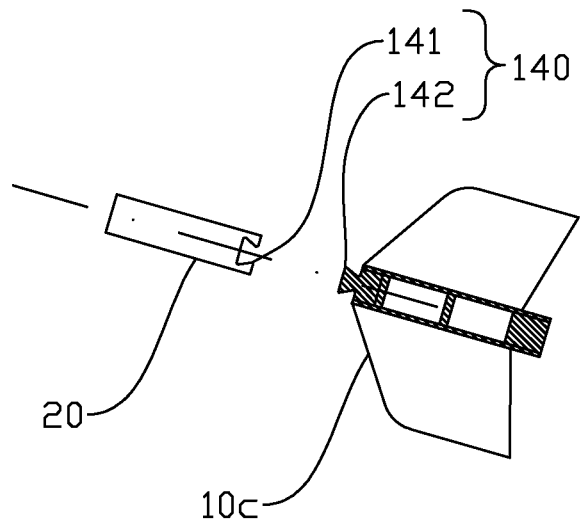
FIG. 3b shows a ground plan of the seed coulter of FIG. 3a released from the tine.
Figure 3C:
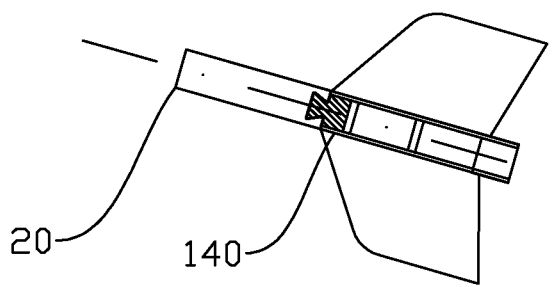
FIG. 3c shows a ground plan of the seed coulter of FIG. 3a connected to the tine.

FIGS. 3a-3c show a third embodiment of the seed coulter 10c, in which the seed coulter 10c is connected to the back 22 of the tine via a dovetail coupling 140. The dovetail coupling 140 comprises a dovetail slot 141 in the back of the tine 20c and a complementary coupling portion 142 on the front of the seed coulter 10c. FIGS. 3b and 3c show the seed coulter 10c seen from above in the longitudinal direction of the tine 20c. In the FIG. 3b, the tine 20c and the seed coulter 10c are shown separated. In the FIG. 3c, the tine 20c and seed coulter 10c are shown connected to each other. Even if the dovetail coupling 140 is shown here with the dovetail slot 141 arranged in the tine 20c and the complementary coupling portion 142 arranged on the seed coulter 10c, it will be obvious to a person skilled in the art to let the dovetail slot 141 and the coupling portion 142 change places.

Figure 4:
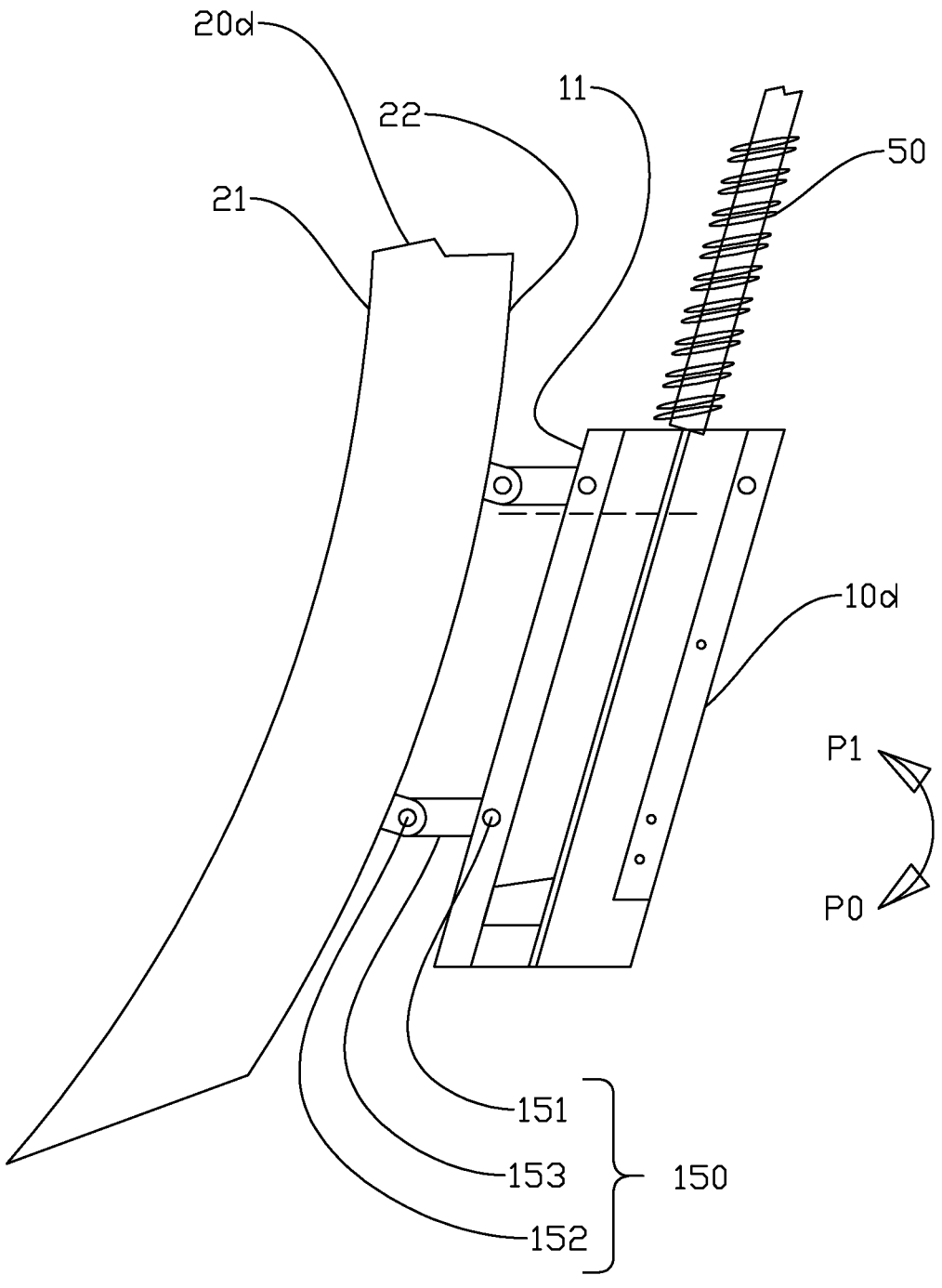
FIG. 4 shows a side view of a fourth embodiment of the connection of the tine and seed coulter.

FIG. 4 shows a fourth embodiment of the seed coulter 10d, in which the seed coulter 10d is connected to the back 22 of a tine 20d via a linkage-arm suspension 150 comprising to linkage arms 153. The tine 20d is shown here with a curved shape. A front 11 of the seed coulter 10*d* is provided with two attachments 151 for a corresponding number of linkage arms 153. The tine 20*d* is provided with two corresponding attachments 153. In FIG. 4, the linkage arms 153 are shown having the same length, so that the seed coulter 10*d* can be moved by translation between the lower position P0 and the upper position P1.

Figures 5A, 5B:
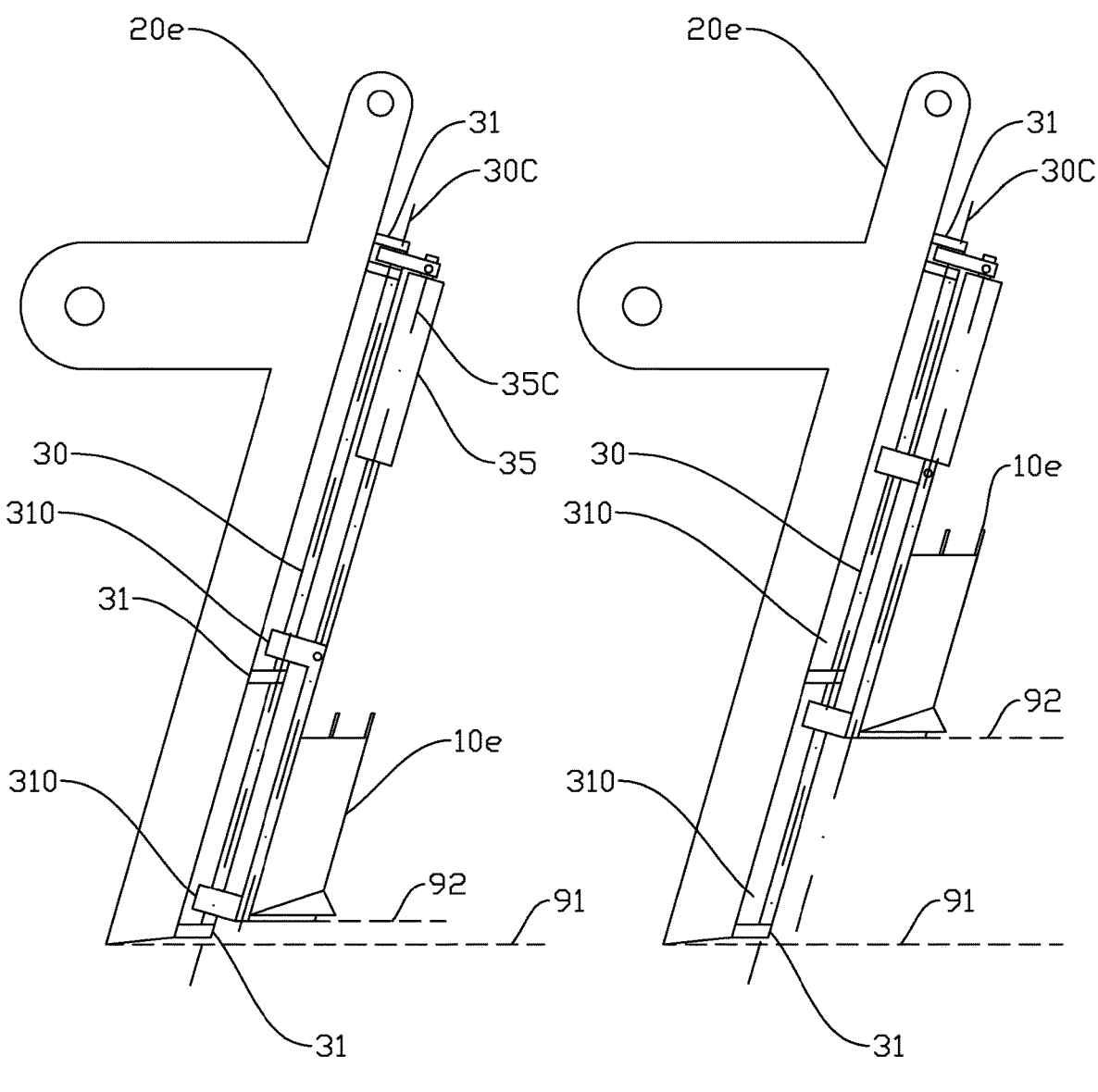
FIG. 5a shows a side view, on a smaller scale, of a fifth embodiment of the connection of the tine and seed coulter, the seed coulter being shown in a first position.
FIG. 5b shows a side view of the fifth embodiment of the connection of the tine and seed coulter, the seed coulter being shown in a second position.

FIGS. 5*a* and 5*b* show a fifth embodiment of the seed coulter 10*e*, in which the seed coulter 10*e* is connected to the back 22 of a tine 20*e* via a rotary joint 30. The rotary joint 30 is shown as a shaft in the figures. The seed coulter 10*e* is rotatably connected to the shaft 30. The shaft 30 is attached to the back of the tine 20*e* via a plurality of attachments 31. The front of the seed coulter 10*e* is provided with two corresponding attachments 310 arranged to rotate around the centre axis 30C of the shaft 30. The attachments 310 comprise bushings (not shown) for giving minimal friction when the attachments 310 are moved along the shaft 30 and rotated around the shaft 30. In an alternative embodiment (not shown), the shaft 30 may be replaced by a downspoute-tube arranged to carry down an input, for example a fertilizer.

In the FIGS. 5*a* and 5*b*, a depth-control device for the seed coulter 10*e* is shown in the form of an actuator 35. In FIG. 5*a*, the actuator 35 is shown extended to a largest length for a maximum working depth. In FIG. 5*b*, the actuator 35 is shown contracted to a smallest length for a minimum working depth. The actuator 35 is rotatably connected to the shaft 30, so that the actuator 35 follows the seed coulter 10*e* when the seed coulter 10*e* rotates. This results in the forces that are applied to the actuator 35 by the seed coulter 10*e* always following the centre axis 35C of the actuator.

Figures 6A, 6B:
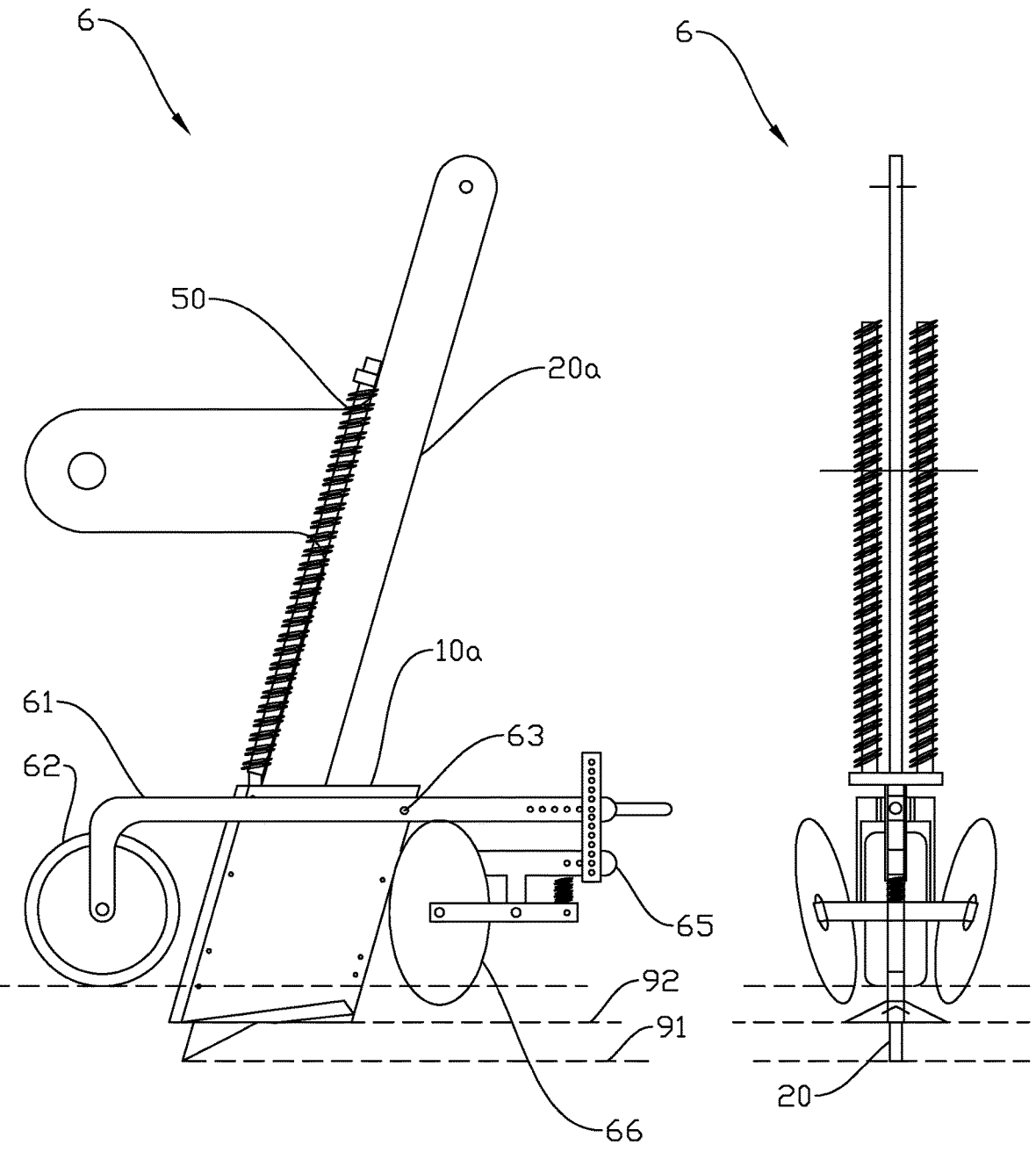
FIG. 6a shows a side view of a seeding unit comprising the seed coulter according to FIG. 1 in a first working position.
FIG. 6b shows the seeding unit according to FIG. 6a viewed from behind.

FIGS. 6*a* and 6*b* show a seeding unit 6 from the side (FIG. 6*a*) and from the rear (FIG. 6*b*), respectively. The seeding unit 6 comprises a seed coulter 10*a*, a tine 20*a*, a depth-wheel suspension 61 with a depth wheel 62, a disc-coulter suspension 65 with two disc coulters 66, and a pressure-loading device 50 comprising two springs.

The working depth of the seed coulter 10*a* is adjusted with the depth-wheel suspension 61 and the depth wheel 62. The pressure-loading device 50 subjects the seed coulter 10*a* to a constant downward force, and the depth wheel 62 keeps the seed coulter 10*a* at a constant working depth. The point 103 of the seed coulter 10*a* and a lower portion of the tine 20*a* form a groove in the soil. When the seed coulter 10*a* is moved forwards, a soil ridge will form on each side of the seed coulter 10*a*. The disc coulters 66 are arranged to level out the soil ridges again by these being moved back behind the seed coulter 10*a*.

A person skilled in the art will understand that the seed coulters (10*b*, 10*c*, 10*d* and 10*e*) shown in FIGS. 1*a*, 2*a*, 3*a*, 4, 5*a* and 4*b*, may be connected to the depth-wheel suspension 61 and the pressure-loading device 50 shown in FIGS. 6*a* and 6*b*.

Figure 7:
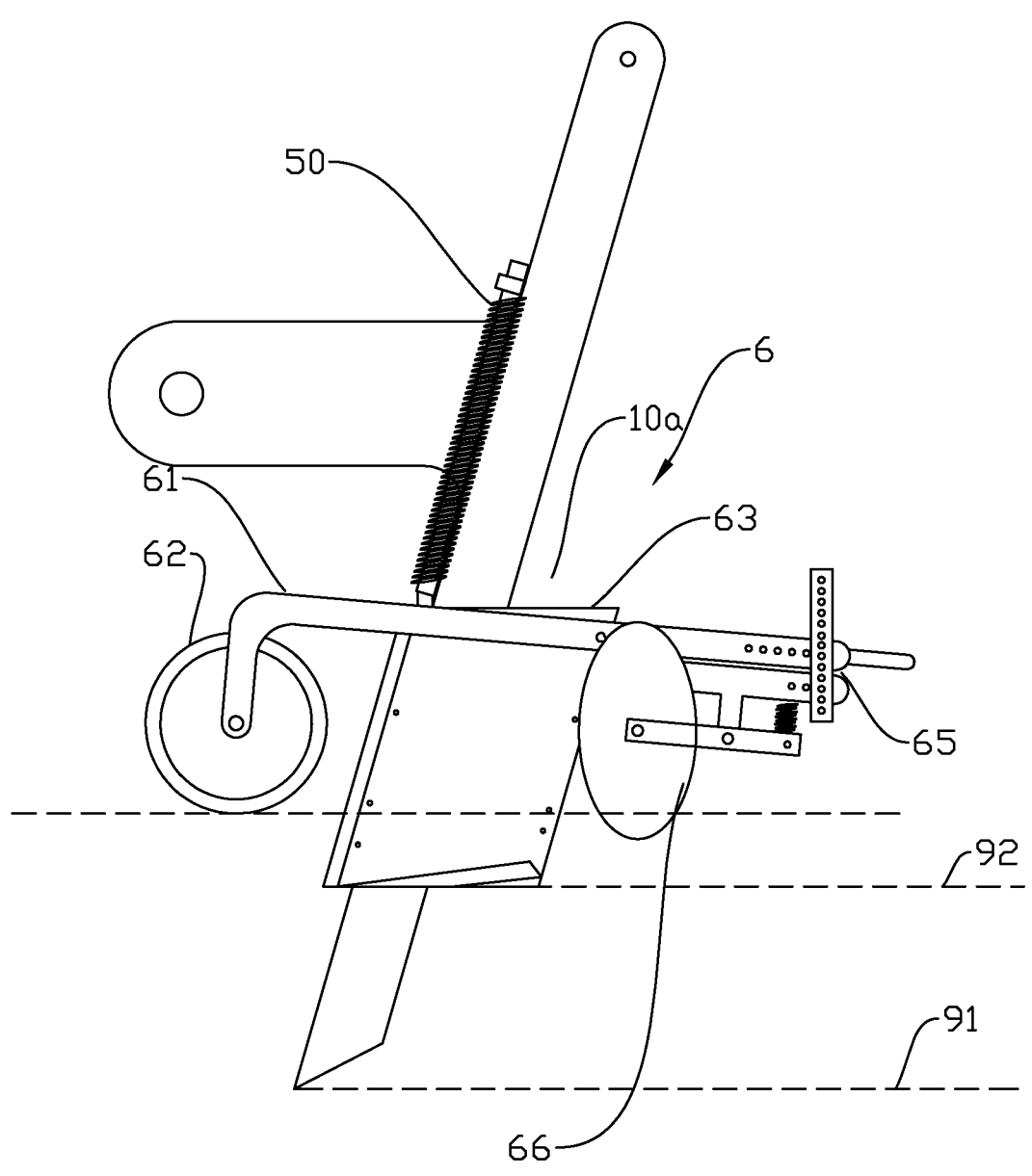
FIG. 7 shows the seeding unit according to FIG. 6a in a second working position.

FIG. 7 shows a seeding unit 6 set with a greater difference between the working depths of the tine 20*a* and the seed coulter 10*a* than what is shown in FIG. 6*a*.

Figure 8:
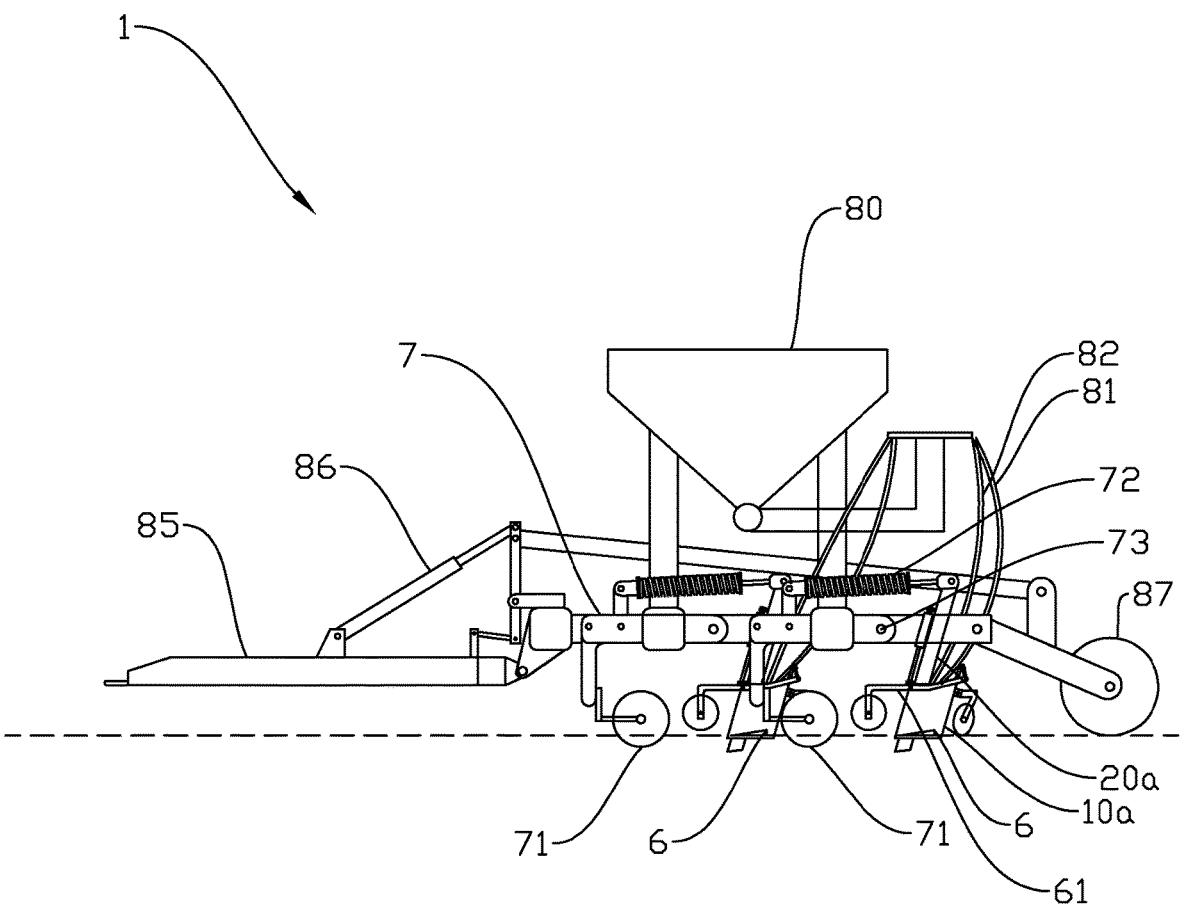

FIG. 8 shows a direct seed drill 1 for field crops. A plurality of seeding units 6 are mounted in two rows on a frame 7. A prior-art disc coulter 71 is positioned in front of each seeding unit 6. The seeding unit 6 can rotate around an attachment point 73 of the tine 20. A stone-release 72, shown as a spring, is arranged to absorb forces to which the tine 20 is subjected in a possible collision with an earthfast rock. A container 80 for inputs is mounted on the frame. Fertilizer and seeds are carried to the seed coulter 10*a* via supply tubes 81, 82 for fertilizer and seed, respectively. A drawbar 85 is arranged to be connectable to a tractor. The working depth of the tines 20*a* is adjusted by changing the stroke length of a cylinder 86. When the stroke length of the cylinder 86 is extended, the drawbar 85 and a row of packer wheels 87 are pushed down, and the frame 7 and the tines 20*a* are raised. The seeding depth is adjusted with the dept-wheel suspension 61 as described above.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A seed coulter arranged to place one or more inputs in a groove behind a tine of a direct seed drill for field crops, the direct seed drill comprising one or more tines for soil tillage, and each tine comprising a front and a back, and the seed coulter comprising at least one delivery channel for carrying said input into the groove behind the tine, wherein:

the seed coulter is arranged for displaceable connection to the tine, wherein the seed coulter is freely displaceable in the longitudinal direction of the tine between a lower position and an upper position;

the seed coulter is arranged for connection to a depth-control device for keeping a seeding depth of the seed coulter constant when a working depth of the tine is lowered or raised during seeding; and the seed coulter comprises an attachment for connection to a rotary joint on the back of the tine, the rotary joint forming a rotary axis directed vertically or substantially coinciding with the longitudinal direction of the tine.

2. The seed coulter in accordance with claim 1, wherein the seed coulter is arranged for linear displacement along the tine.

3. The seed coulter in accordance with claim 1, wherein the depth-control device is arranged to sense a surface of the seedbed.

4. The seed coulter in accordance with claim 1, wherein the seed coulter is arranged to be connected to a pressure-loading device.

5. A seeding unit for a direct seed drill for field crops, wherein the seeding unit comprises a seed coulter, wherein the seed coulter is arranged to place one or more inputs in a groove behind a tine of the direct seed drill for field crops, the direct seed drill comprising one or more tines for soil tillage, and each tine comprising a front and a back, and the seed coulter comprising at least one delivery channel for carrying said input into the groove behind the tine, wherein:

the seed coulter is arranged for displaceable connection to the tine, wherein the seed coulter is freely displaceable in the longitudinal direction of the tine between a lower position and an upper position;

the seed coulter is arranged for connection to a depth-control device for keeping a seeding depth of the seed coulter constant when a working depth of the tine is lowered or raised during seeding, and the seed coulter is connected to the tine; and the seed coulter comprises an attachment for connection to a rotary joint on the back of the tine, the rotary joint forming a rotary axis directed vertically or substantially coinciding with the longitudinal direction of the tine.

6. The seeding unit in accordance with claim 5, wherein the seeding unit comprises at least one of a depth-control device, a pressure-loading device, and a coulter.

7. The seeding unit in accordance with claim 5, wherein the tine is arranged for strip tillage.

8. A direct seed drill for field crops, wherein the direct seed drill comprises a plurality of seeding units, wherein the seeding units comprise a seed coulter, wherein the seed coulter is arranged to place one or more inputs in a groove behind a tine of the direct seed drill for field crops, the direct seed drill comprising one or more tines for soil tillage, and each tine comprising a front and a back, and the seed coulter comprising at least one delivery channel for carrying said input into the groove behind the tine, wherein:

the seed coulter is arranged for displaceable connection to the tine, wherein the seed coulter is freely displaceable in the longitudinal direction of the tine between a lower position and an upper position;

the seed coulter is arranged for connection to a depth-control device for keeping a seeding depth of the seed coulter constant when a working depth of the tine is lowered or raised during seeding, and the seed coulter is connected to the tine; and the seed coulter comprises an attachment for connection to a rotary joint on the back of the tine, the rotary joint forming a rotary axis directed vertically or substantially coinciding with the longitudinal direction of the tine.

9. The seeding unit in accordance with claim 5, wherein the seed coulter is arranged for linear displacement along the tine.

10. The seeding unit in accordance with claim 5, wherein the depth-control device is arranged to sense a surface of the seedbed.

11. The seeding unit in accordance with claim 5, wherein the seed coulter is arranged to be connected to a pressure-loading device.

12. The seeding unit in accordance with claim 6, wherein the seed coulter is arranged to be connected to the pressure-loading device.

13. The direct seed drill in accordance with claim 8, wherein the seed coulter is arranged for linear displacement along the tine.

14. The direct seed drill in accordance with claim 8, wherein the depth-control device is arranged to sense a surface of the seedbed.

15. The direct seed drill in accordance with claim 8, wherein the seed coulter is arranged to be connected to a pressure-loading device.

\* \* \* \* \*